United States Patent
Zhang et al.

(10) Patent No.: US 11,620,760 B2
(45) Date of Patent: Apr. 4, 2023

(54) RANGING METHOD BASED ON LASER-LINE SCANNING IMAGING

(71) Applicant: Tsinghua Shenzhen International Graduate School, Guangdong (CN)

(72) Inventors: Yongbing Zhang, Guangdong (CN); Xizhi Huang, Guangdong (CN); Xiangyang Ji, Guangdong (CN); Haoqian Wang, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 122 days.

(21) Appl. No.: 17/355,182

(22) Filed: Jun. 23, 2021

(65) Prior Publication Data
US 2021/0319573 A1    Oct. 14, 2021

Related U.S. Application Data

(63) Continuation of application No. PCT/CN2019/115033, filed on Nov. 1, 2019.

(30) Foreign Application Priority Data

Apr. 29, 2019    (CN) .......................... 201910359635.3

(51) Int. Cl.
*G06T 11/00* (2006.01)
*G06T 7/521* (2017.01)

(52) U.S. Cl.
CPC ............ *G06T 7/521* (2017.01); *G06T 11/003* (2013.01); *G06T 2207/10028* (2013.01); *G06T 2211/436* (2013.01)

(58) Field of Classification Search
CPC .................... G06T 7/521; G06T 11/003; G06T 2207/10028; G06T 2211/436
See application file for complete search history.

(56) References Cited

U.S. PATENT DOCUMENTS

| | | | |
|---|---|---|---|
| 6,600,168 B1* | 7/2003 | Geng | .................. G06V 10/145 |
| | | | 250/559.22 |
| 10,607,351 B2* | 3/2020 | Varekamp | ............... G06T 7/521 |

(Continued)

FOREIGN PATENT DOCUMENTS

| CN | 101408410 A | 4/2009 |
|---|---|---|
| CN | 101929850 A | 12/2010 |

(Continued)

OTHER PUBLICATIONS

Yang et al., Depth Estimation from Light Field Analysis Based Multiple Cues Fusion, Chinese Journal of Computers, vol. 38, No. 12, Dec. 2015, pp. 2437-2449.

(Continued)

*Primary Examiner* — Gregory M Desire
(74) *Attorney, Agent, or Firm* — Winston Hsu

(57) ABSTRACT

The present invention provides a ranging method based on laser-line scanning imaging to effectively suppress interference of extreme weather on imaging. The method includes the following steps: acquiring priori reference images for a fixed laser-line scanning system, including respectively placing reference whiteboards at different distances, projecting line laser beams to the whiteboards, and acquiring the reference images by using a camera; placing a laser-line scanning device in a real scene, causing the laser-line scanning device to respectively emit line lasers at different angles, and acquiring an image at each scanning angle by using a camera; and performing fusion calculation on the acquired scanning image in the real scene and the priori reference images by using a ranging algorithm based on laser-line scanning, and extracting distance information of a surrounding object, to implement environment perception.

9 Claims, 3 Drawing Sheets

(56) References Cited

U.S. PATENT DOCUMENTS

| | | | | |
|---|---|---|---|---|
| 10,823,852 B2 * | 11/2020 | Zhang | ................... | H01S 3/025 |
| 11,158,074 B1 * | 10/2021 | Kantor | ................... | G06T 7/521 |
| 11,443,447 B2 * | 9/2022 | Wang | ................... | G06T 7/521 |
| 2015/0316650 A1 | 11/2015 | Imai | | |
| 2018/0164562 A1 | 6/2018 | Byeon | | |

FOREIGN PATENT DOCUMENTS

| | | | |
|---|---|---|---|
| CN | 102589476 A | 7/2012 | |
| CN | 103954232 A | 7/2014 | |
| CN | 104266605 A | 1/2015 | |
| CN | 104881858 A | 9/2015 | |
| CN | 106371281 A | 2/2017 | |
| CN | 106454116 A | 2/2017 | |
| CN | 107424195 A | 12/2017 | |
| CN | 108279420 A | 7/2018 | |
| CN | 108387186 A | 8/2018 | |
| CN | 108761482 A | 11/2018 | |
| CN | 208171197 U | 11/2018 | |
| CN | 109187459 A | 1/2019 | |
| CN | 109387852 A | 2/2019 | |
| JP | 2012-47656 A | 3/2012 | |

OTHER PUBLICATIONS

Wu et al., Depth estimation based on confocal image sequence, Computer Applications and Software, vol. 29, No. 12, Dec. 2012, , pp. 43-46.

* cited by examiner

RANGING METHOD BASED ON LASER-LINE SCANNING IMAGING

CROSS REFERENCE TO RELATED APPLICATIONS

This application is a continuation application of PCT/CN2019/115033 filed on 2019 Nov. 1, which claims priority to CN patent application NO. 201910359635.3 filed on 2019 Apr. 29. The contents of the above-mentioned application are all hereby incorporated by reference.

BACKGROUND OF THE INVENTION

1. Field of the Invention

The present invention belongs to the field of scene reconstruction and environment perception, and specifically relates to a ranging technology based on laser-line scanning imaging.

2. Description of the Prior Art

Currently, sensors applied in autonomous driving mainly include millimeter-wave radars, laser radars, and cameras. The implementation of environment perception by imaging has the advantages of a large amount of information obtained and low costs, but is susceptible to interference caused by light scattering and reflection under rainy, foggy and other rough weather conditions, resulting in a large error in ranging and reconstruction.

SUMMARY OF THE INVENTION

An objective of the present invention is to resolve the disadvantage in the field of autonomous driving that the implementation of scene reconstruction by imaging is susceptible to interference by a rough environment, and provide method for ranging and scene reconstruction based on laser-line scanning imaging.

The method for ranging and scene reconstruction based on laser-line scanning imaging provided in the present invention includes the following steps:

1) acquiring priori reference images for a fixed laser-line scanning system, including respectively placing reference whiteboards at different distances, projecting line laser beams to the whiteboards, and acquiring the reference images by using a camera;

2) placing a laser-line scanning device in a real scene, causing the laser-line scanning device to respectively emit line laser beams at different angles, and acquiring an image at each scanning angle by using a camera; and 3) performing fusion calculation on the acquired scanning image in the real scene and the priori reference images by using a ranging algorithm based on laser-line scanning, and extracting distance information of a surrounding object, to implement environment perception.

The advantages of the present invention lie in that a line laser is used as the light source, and images in a corresponding band are acquired, so that the impact of light reflection and scattering in rough weather can be weaken to some extent. In addition, fast line laser scanning and image acquisition are implemented by using a rotating galvanometer and a high-speed camera, to perform real-time environment perception.

These and other objectives of the present invention will no doubt become obvious to those of ordinary skill in the art after reading the following detailed description of the preferred embodiment that is illustrated in the various figures and drawings.

DETAILED DESCRIPTION

The present invention is further described below with reference to the accompanying drawings.

In the following embodiments of the present invention, a line laser in a near-infrared band is used as a light source to fast scan a surrounding scene, a camera is used to acquire images in a special band, and the surrounding scene is finally reconstructed using the images. This method avoids the use of radar ranging and therefore effectively reduces the costs. The impact of light reflection and scattering in rough weather can be weaken to some extent by implementing environment perception by imaging, using the line laser as the light source, and acquiring images in a corresponding band.

The following embodiments of the present invention are applicable to scene reconstruction and environment perception. The imaging-based environment perception technology widely used in the research fields such as autonomous driving is susceptible to interference caused blight scattering and reflection under rainy, foggy and other rough weather conditions, resulting in a large error in ranging and reconstruction.

Therefore, the embodiments of the present invention provide a ranging method based on laser-line scanning imaging to effectively suppress interference of extreme weather on imaging. The method includes the following steps:

acquiring priori reference images for a fixed laser-line scanning system, including respectively placing reference whiteboards at different distances, projecting line laser beams to the whiteboards, and acquiring the reference images by using a camera;

placing a laser-line scanning device in a real scene, causing the laser-line scanning device to respectively emit line lasers at different angles, and acquiring an image at each scanning angle by using a camera; and performing fusion calculation on the acquired scanning image in the real scene and the priori reference images by using a ranging algorithm based on laser-line scanning, and extracting distance information of a surrounding object, to implement environment perception.

Figure 1:
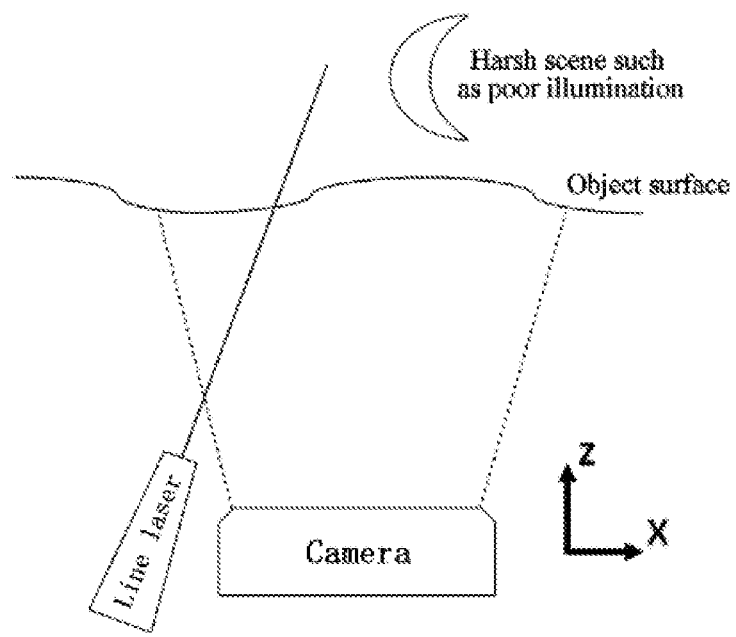
FIG. 1 is a schematic diagram of an acquisition system in a real scene.

FIG. 1 is a schematic diagram of an acquisition system in a real scene. Alien laser and a camera are fixed relative to each other, and form an angle. The scanning manner adopts integral rotation. That is, the laser source and the camera rotate simultaneously. In this way, a line laser beam is projected to different positions of an object surface during rotation. An x direction in the schematic diagram is a transversal direction of the camera, that is, a width direction of an acquired image, and a z direction is a depth direction of the camera, that is, a distance of a surrounding environment that needs to be perceived. In addition, a y direction is a height direction of the acquired image. The line laser beam is a ray projected perpendicular to the direction, parallel to the y direction, and toward the z direction, and looks like a line rather than a point when viewed from a remote distance. Therefore, the object surface shown in FIG. 1 is only a surface of an object with a value of y in the x direction, and the line laser can detect the y values within a certain range (depending on the length of the line laser, longitudinal resolution of the camera, and the distance of probing), and therefore can detect a surface status of the object ate certain angle (depending on a scanning angle range) from a remote distance.

The line laser source and the camera rotate simultaneously, and one image is acquired each time they are rotated by an angle. Assuming that the abscissa and ordinate of each image are an x-axis and a y-axis respectively, y-direction information of the image corresponds to y-direction information of the acquisition system, and x-direction information of the image corresponds to z-direction information of the acquisition system, that is, distance information of a surrounding environment. The x-direction information of the acquisition system is determined by the scanning angle. For example, if the laser source and the camera rotate by 30 degrees, information about perception of remote objects within a range of 30 degrees using the rotation axis as the center can be obtained.

Figure 5:
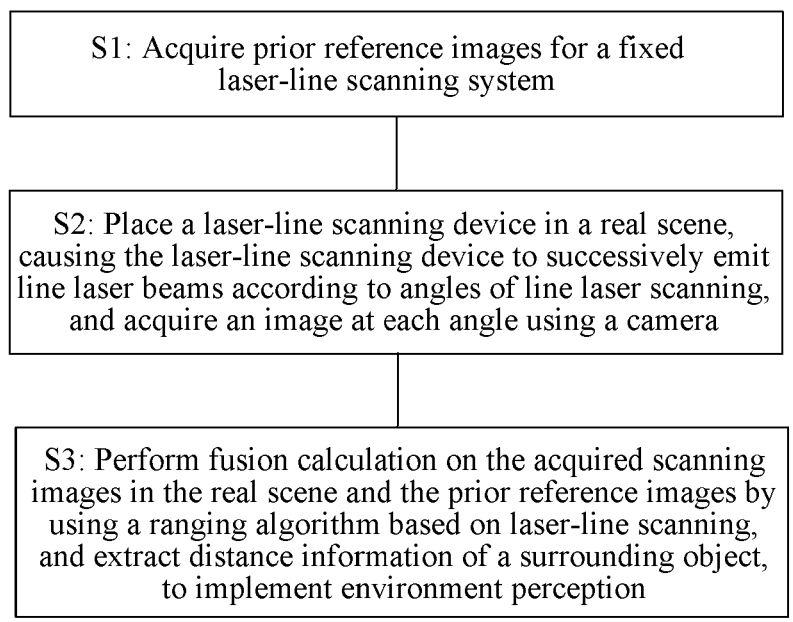
FIG. 5 is a schematic flowchart according to an embodiment of the present invention.

As shown in FIG. 5, the method for ranging and scene reconstruction based on laser-line scanning imaging includes the following steps:

1) acquiring priori reference images for a fixed laser-line scanning system, respectively placing reference whiteboards at different depths, projecting line laser beams to the whiteboards from different angles, and acquiring the reference images by using a camera, wherein it is assumed that the angles of line laser scanning are $X_1, X_2, \ldots,$ and $X_n$ respectively, and sampling depths are $Z_1, Z_2, \ldots,$ and $Z_m$ respectively;

2) placing a laser-line scanning device in a real scene, causing the laser-line scanning device to successively emit line laser beams at angles $X_1, X_2, \ldots,$ and $X_n$, and acquiring an image at each angle by using a camera; and 3) performing fusion calculation on the acquired scanning image in the real scene and the priori reference images by using a ranging algorithm based on laser-line scanning, and extracting distance information of a surrounding object, to implement environment perception.

A general algorithm procedure is as follows:

(1) when the reference images are acquired for an acquisition system, there are a total of n*m images at angles $X_1$-$X_n$ and at depths $Z_1$-$Z_m$, and the reference images are expressed as $M(X_i Z_j)$, wherein i=1, 2, . . . , or n, and j=1, 2, . . . , or m;

(2) n images are acquired at the angles $X_1$-$X_n$ in the real scene, and the images are expressed as $O(X_i)$, wherein i=1, 2, . . . , or n;

(3) tomographic information $O(X_i)*M(X_i Z_j)$ at an angle $X_i$ and at a depth $Z_j$ is calculated by using a focal surface characteristic of virtual confocal imaging, wherein i=1, 2, . . . , or n, and j=1, 2, . . . , or m;

(4) a surface depth at the angle $X_i$ is obtained by using a modulation characteristic of structured light imaging, based on the following calculation formula:

$$Z_{surf}(X_i) = \mathrm{argmax}_{(Z_j)}(O(X_i)*M(X_i Z_j)), \quad \text{wherein } i = 1, 2, \ldots, \text{ or } n; \text{ and}$$

(5) a three-dimensional point cloud map of an object is reconstructed by using the surface depth $Z_{surf}(X_i)$, to implement environment perception.

The principle that the imaging system performs a fusion calculation on the priori images and the acquired image to obtain the tomographic information for three-dimensional reconstruction is described below.

Figure 2:
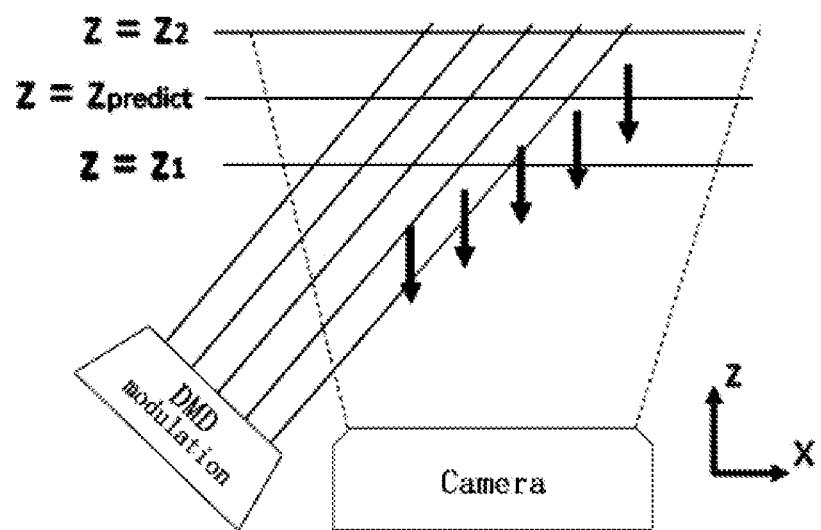
FIG. 2 is a principle diagram of acquiring priori information according to an embodiment of the present invention.

FIG. 2 shows a principle of acquiring priori information. A DMD modulation apparatus emits light and modulates the light into a line-array mode, and projects the light to whiteboards at different depths (z values), and a camera is used to acquire an image. Assuming that a pitch between line arrays is 30 pixels, a total of 30 modulated line arrays are emitted, and all the line arrays together exactly cover an entire image, thereby ensuring the integrity of sampling information. The positions of the line arrays are expressed as $x_1$-$x_{30}$. At a $z=z_1$ position, 30 reference images may be obtained, which are respectively obtained by projecting the 30 modulated line arrays to a whiteboard at the $z=z_1$ position and are expressed as $Mx_1 z_1$-$Mx_{30} z_1$. Similarly, 30 reference images at another z position may also be obtained. After the reference images at two z positions (such as the $z_1$ position and the $z_2$ position) are obtained, images at the other z positions may be predicted. In this way, the acquisition of the priori images requires acquiring images at only two z positions.

After the priori images at the z positions are obtained, the system is applied to acquire an image in a real scene. One image is acquired by using each of 30 line arrays, and the images are expressed as $Ox_1$-$Ox_{30}$. Then, a tomographic image at a position $z_i$ may be obtained through calculation:

$$Iz_i = (Ox_1 * Mx_1 z_i + \quad . \quad . \quad . \quad + Ox_{30} * Mx_{30} z_i)/(Mx_1 z_i + \ldots + Mx_{30} z_i) \quad (1)$$

where the position $z_i$ represents a depth position for which tomographic information is required. By using tomographic information at different z positions, a surface point cloud map of an object may be obtained by taking a maximum value of each pixel, so as to obtain perception information for reconstruction. The algorithm utilizes a modulation characteristic of structured light imaging, and the projection of the modulated image to the object to obtain the tomographic information also utilizes a focal surface characteristic of a virtual confocal system. It is worth mentioning that one system can be applied to the reconstruction of different scenes once the acquisition of priori images is finished.

Figure 3:
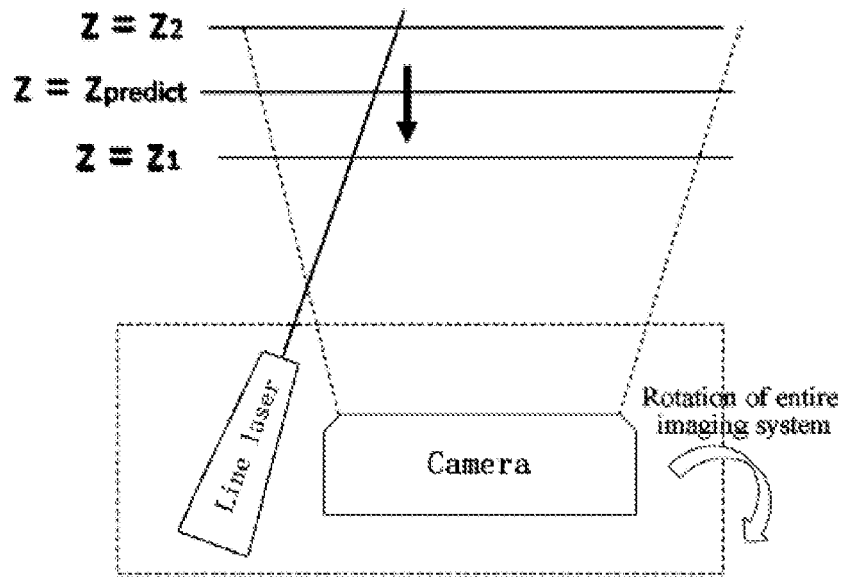
FIG. 3 is a schematic diagram of acquiring priori images by line laser imaging according to an embodiment of the present invention.

FIG. 3 is a schematic diagram of acquiring priori images by line laser imaging. This is different from the foregoing principle diagraming that scanning of the line arrays adopts rotation of the entire imaging system, and movement in the transversal direction (x direction) is replaced by angle deflection. In this way, a reconstructed point cloud map lies in a polar coordinate system. In addition, because the laser source and the camera rotate together, the priori images are the same for different angles, that is, $Mx_1 z_i = Mx_2 z_i = \ldots = Mx_n z_i = Mz_i$. In this case, for an angle $x_i$, if section information of a corresponding depth $z_j$ is $Ox_i Mz_j$, a surface depth at an $x_i$ position is $z_{surf} = \mathrm{argmax}_{(zj)}(Ox_i Mz_j)$. In this case, a distance to the surface of an object at each angle may be extracted for reconstructing a three-dimensional point cloud map.

In a scene of autonomous driving, it is necessary to use fast scanning for environment perception. The implementation of environment perception using images is a challenge for both hardware facilities and the calculation speed, and imaging using laser-line scanning further requires even higher scanning and imaging speeds. However, simultaneous rotation and scanning of the laser source and the camera greatly limit the imaging speed. Therefore, it is necessary to improve the system by using galvanometer deflection to implement scanning, thereby increasing the scanning and imaging speeds.

Figure 4:
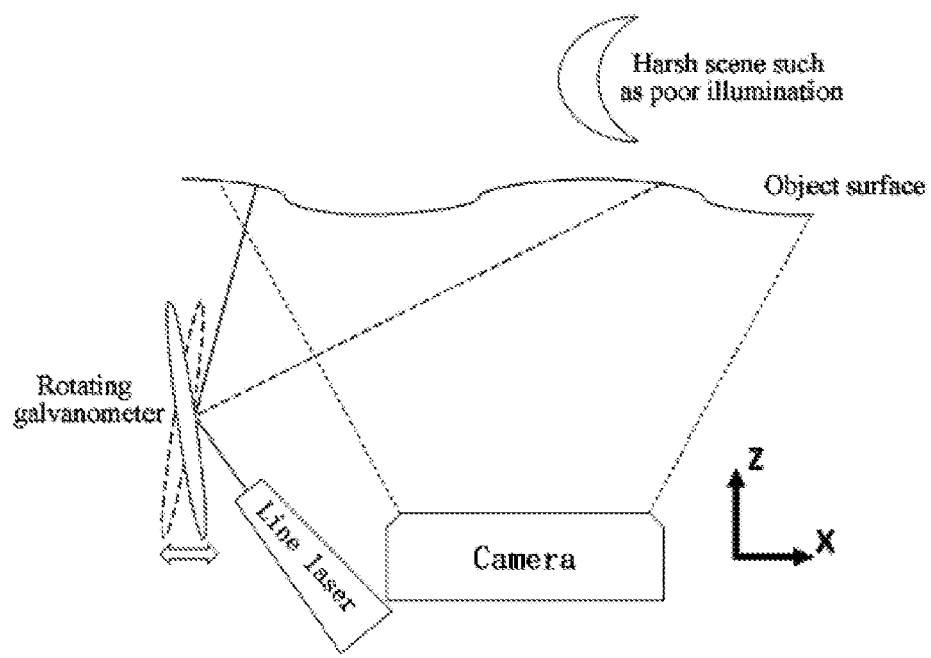
FIG. 4 is a schematic diagram of an improved acquisition system based on a rotating galvanometer according to an embodiment of the present invention.

FIG. 4 is a schematic diagram of an improved acquisition system based on a rotating galvanometer, in which the rotating galvanometer is additionally provided to enable fast line laser scanning, and a high-speed camera is used to acquire a sampling image within a certain angle. The improved imaging system has functions of high-speed scanning and fast modeling perception.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A ranging method based on laser-line scanning imaging, the method comprising the following steps:
    S1: acquiring priori reference images for a fixed laser-line scanning system;
    S2: placing a laser-line scanning device in a real scene, causing the laser-line scanning device to successively emit line laser beams according angles of line laser scanning, and acquiring an image at each angle by using a camera; and
    S3: performing fusion calculation on the acquired scanning image in the real scene and the priori reference images by using a ranging algorithm based on laser-line scanning, and extracting distance information of a surrounding object, to implement environment perception,
    wherein in the step S1, during acquisition, reference whiteboards are respectively placed at different depths $Z_1, Z_2, \ldots$, and $Z_m$, line laser beams are respectively projected to the whiteboards from different angles $X_1$, $X_2, \ldots$, and $X_n$, and the reference images are acquired using a camera.

2. The ranging method based on laser-line scanning imaging according to claim 1, wherein the line laser scanning is implemented by using the following method: emitting a line laser beam perpendicular to a ground by a laser source, wherein the laser source and the camera are fixed relative to each other, and mechanically rotating the laser source about a central axis perpendicular to the ground.

3. The ranging method based on laser-line scanning imaging according to claim 1, wherein the line laser scanning is implemented by using the following method: projecting a line laser beam perpendicular to a ground to a rotating galvanometer near the light source for reflection, to implement the line laser scanning through fast rotation of the galvanometer.

4. The ranging method based on laser-line scanning imaging according to claim 1, wherein in the step S3, the algorithm used integrates a modulation characteristic of structured light imaging and a focal surface characteristic of virtual confocal imaging.

5. The ranging method based on laser-line scanning imaging according to claim 1, wherein in hardware, a scanning line laser is used as a light source for modulation tomographic information is separated during reconstruction, and a perception model is constructed.

6. The ranging method based on laser-line scanning imaging according to claim 1, wherein a scanning angle range determines an angle for reconstructing an ambient environment, and a depth range selected for the reference images determines a depth of reconstruction.

7. The ranging method based on laser-line scanning imaging according to claim 1, wherein specific algorithm steps are as follows:
    in the step S1, when the reference images are acquired for an acquisition system, there are a total of n*m images at angles $X_1$-$X_n$ and at depths $Z_1$-$Z_m$, and the reference images are expressed as $M(X_i Z_j)$, wherein i=1, 2, . . . , or n, and j=1, 2, . . . , or m;
    in the step S2, n images are acquired at the angles $X_1$-$X_n$ in the real scene, and the images are expressed as $O(X_i)$, wherein i=1, 2, . . . , or n; and
    in the step S3, tomographic information $O(X_i)*M(X_i Z_j)$ at an angle $X_i$ and at a depth $Z_j$ is calculated by using a focal surface characteristic of virtual confocal imaging, wherein i=1, 2, . . . , or n, and j=1, 2, . . . , or m;
    a surface depth at the angle $X_i$ is obtained by using a modulation characteristic of structured light imaging; and
    a three-dimensional point cloud map of an object is reconstructed by using the surface depth $Z_{surf}(X_i)$, to implement environment perception.

8. The ranging method base on laser-line scanning imaging according to claim 7, wherein the surface depth at the angle $X_i$ is obtained based on the following calculation formula by using the modulation characteristic of structured light imaging:

$$Z_{surf}(X_i) = \mathrm{argmax}_{(Z_j)}(O(X_i)*M(X_i Z_j)), \text{ wherein } i=1,2,\ldots, \text{ or } n.$$

9. A ranging apparatus based on laser-line scanning imaging, comprising a memory and a processor, the memory storing a computer program, the computer program, when executed by a processor, implementing the ranging method based on laser-line scanning imaging according to claim 1.

* * * * *